United States Patent [19]

Hirata et al.

[11] Patent Number: 4,970,505
[45] Date of Patent: Nov. 13, 1990

[54] THREE STAGE SWITCHING APPARATUS

[75] Inventors: Yoshimi Hirata; Yuki Yoshifuji, both of Tokyo, Japan

[73] Assignee: NEC Corporation, Tokyo, Japan

[21] Appl. No.: 179,631

[22] Filed: Apr. 8, 1988

[30] Foreign Application Priority Data

Apr. 9, 1987 [JP] Japan .............................. 62-52688[U]
Apr. 9, 1987 [JP] Japan .............................. 62-52689[U]

[51] Int. Cl.$^5$ .............................................. H04Q 1/00
[52] U.S. Cl. ......................... 340/825.800; 340/825.01; 340/827
[58] Field of Search ................... 340/825.01, 826, 827, 340/825.8; 370/16, 58; 379/271, 272, 273, 279

[56] References Cited

U.S. PATENT DOCUMENTS

| | | | |
|---|---|---|---|
| 4,400,627 | 8/1983 | Zola | 340/825.8 |
| 4,536,870 | 8/1985 | Bovo et al. | 370/16 |
| 4,654,842 | 3/1987 | Coraluppi et al. | 370/16 |
| 4,807,280 | 2/1989 | Posner et al. | 340/826 |
| 4,811,333 | 3/1989 | Rees | 340/825.8 |

OTHER PUBLICATIONS

Bell System Technical Journal vol. 32, No. 2, pp. 406–424, "A Study of Non-Blocking Switching Networks", Mar. 1953.

Primary Examiner—Donald J. Yusko
Assistant Examiner—Edwin C. Holloway, III
Attorney, Agent, or Firm—Foley & Lardner, Schwartz, Jeffery, Schwaab, Mack, Blumenthal & Evans

[57] ABSTRACT

A three stage switching apparatus freely connects N input terminals and N output terminals and includes a first stage, a second stage, a third stage, and a connecting circuit. The first stage is constituted by at least N/n first matrix switches. The second stage is constituted by at least 2n − 1 second matrix switches. The third stage is constituted by at least N/n third matrix switches. The connecting circuit connects the input terminals and the first stage, the first stage and the second stage, the second stage and the third stage, and the third stage and the output terminals such that the number of paths connecting an arbitrary one of the input terminals and an arbitrary one of the output terminals is 2n.

5 Claims, 4 Drawing Sheets

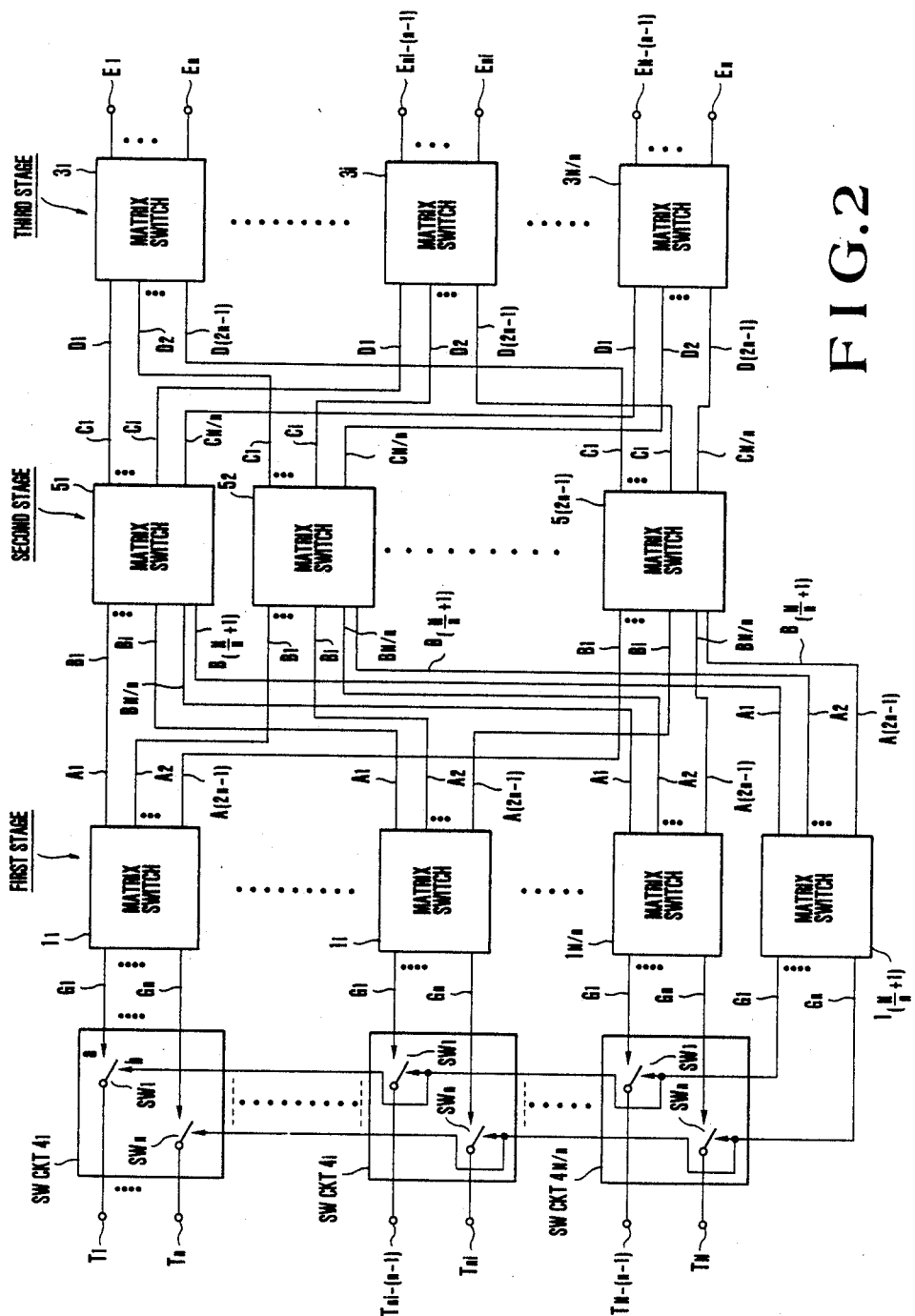
F I G. 2

4,970,505

THREE STAGE SWITCHING APPARATUS

BACKGROUND OF THE INVENTION

The present invention relates to a three stage switching apparatus and, more particularly, to a network of a three stage switching apparatus and its structure.

Three stage switching networks are often used as switching networks having N input terminals and N output terminals and freely connecting the input and output terminals. An example of a three stage switching network is described in "A Study of Non-Blocking Switching Networks" on BELL SYSTEM TECHNICAL JOURNAL Vol. 32, No. 2, pp. 406 to 424. As described in this paper, a switching network can be conveniently applied to a large telephone switching system since the larger the number N of input/output terminals, the smaller the number of crosspoints than $N^2$.

However, in the conventional three stage switching networks, redundancy is not considered. Therefore, even when a single switch is failed, one of the most important functions of a switching network to connect arbitrary input and output terminals is lost.

In a conventional switching system having a three stage switching network, since printed circuit boards constituting the respective stages are connected to each other through a back wired board, the number of signal lines is limited and the wiring is complex.

SUMMARY OF THE INVENTION

It is an object of the present invention to provide a three stage switching network wherein the above drawbacks of the conventional technique are removed and its function is not degraded even if one of its switches is failed.

It is another object of the present invention to provide a three stage switching apparatus wherein wiring can be easily performed even when the number of signal lines is increased.

The three stage switching apparatus according to the present invention has first, second, third stage networks between N input terminals and N output terminals and comprises: at least N/n first matrix switches constituting the first stage, each of the first matrix switches having n input lines connected to the N input terminals in one-to-one correspondence and at least $2n-1$ output lines, the input and output lines of each of the first matrix switches being internally, freely connected to each other, at least $2n-1$ second matrix switches constituting the second stage, each of the second matrix switches having input lines of the same number as that of the first matrix switches and at least N/n output lines, the input and output lines of each of the second matrix switches being internally, freely connected to each other, at least N/n third matrix switches constituting the third stage, each of the third matrix switches having input lines of the same number as that of the second matrix switches and n output lines, the input and output lines of each of the third matrix switches being internally, freely connected to each other, and means for connecting the input terminals and the first matrix switches, the first matrix switches and the second matrix switches, the second matrix switches and the third matrix switches, and the third matrix switches and the output terminals such that the number of paths connecting arbitrary one of the input terminals and arbitrary one of the output terminals is 2n.

The three stage switching apparatus according to the present invention also comprises: a plurality of first printed circuit boards respectively having first matrix switches of a first stage, arranged to be parallel to each other, and having fixed output ends of the first matrix switches, a plurality of second printed circuit boards respectively having second matrix switches of a second stage, arranged to be parallel to each other, and having fixed input and output ends of the second matrix switches so as to be perpendicular to the plurality of first printed circuit boards, a plurality of third printed circuit boards respectively having third matrix switches of a third stage, and fixed input ends of the third matrix switches so as to be perpendicular to the plurality of second printed circuit boards, a first connector for supporting the output ends of the first printed circuit boards and the input ends of the second printed circuit board and electrically connecting the first and second matrix switches, and a second connector for supporting the output ends of the second printed circuit board and the input ends of the third printed circuit board and electrically connecting the second and third matrix switches.

BRIEF DESCRIPTION OF THE DRAWINGS

FIG. 2 is a block diagram of a circuit arrangement according to another embodiment of the present invention;

DETAILED DESCRIPTION OF THE PREFERRED EMBODIMENTS

Preferred Embodiments of the present invention will be described in detail with reference to the accompanying drawings.

Figure 1:
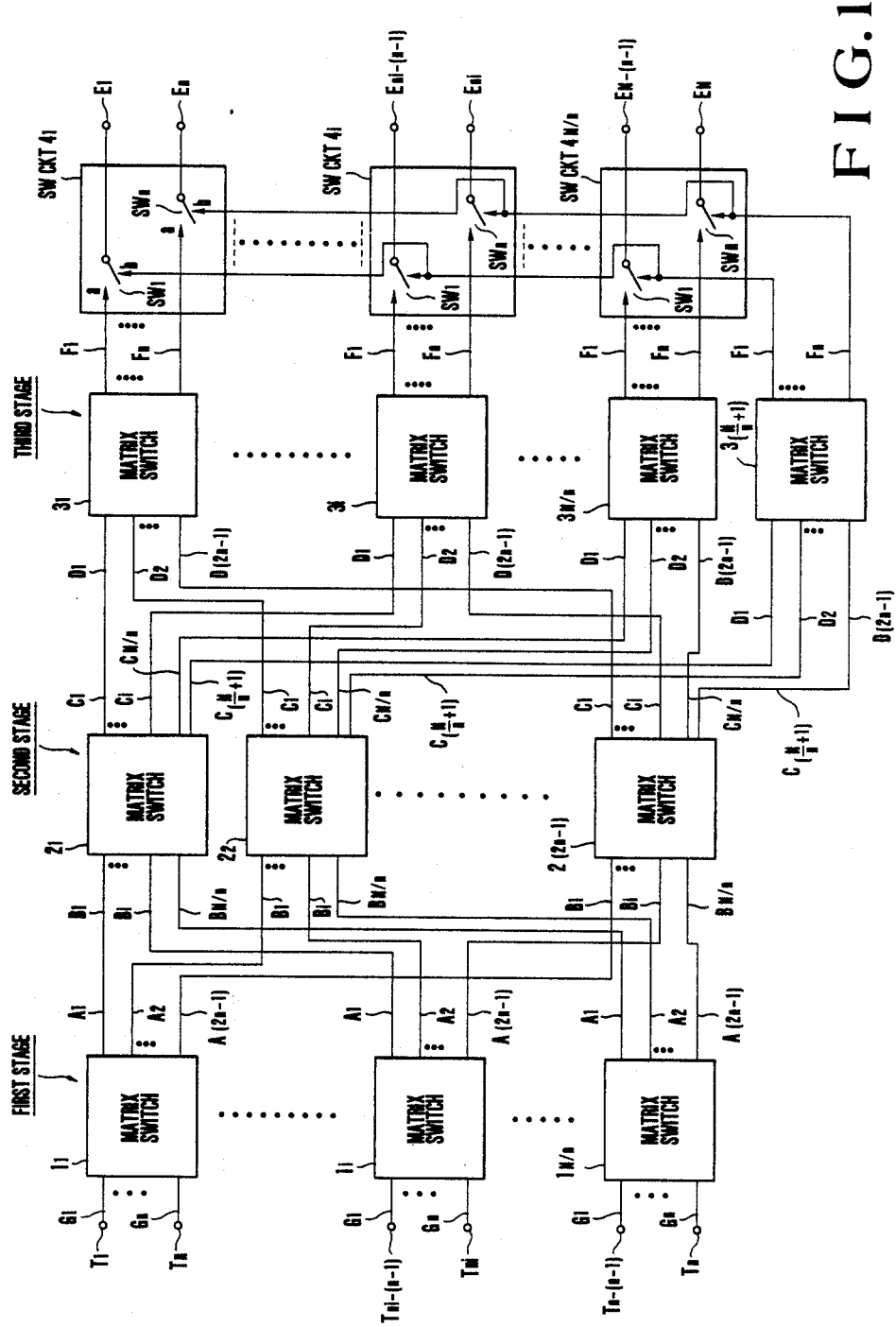
FIG. 1 is a block diagram of a circuit arrangement according to an embodiment of the present invention.

FIG. 1 is a block diagram of a three stage switching network according to an embodiment of the present invention.

Referring to FIG. 1, the three stage switching network has N input terminals $T_1$ to $T_N$, N output terminals $E_1$ to $E_N$, and first, second, and third stages provided between the input and output terminals $T_1$ to $T_N$ and $E_1$ to $E_N$.

The input terminals $T_1$ to $T_N$ are divided into N/n groups each having n input terminals $T_{ni-(n-1)}$ to $T_{ni}$ (i=1 to N). Each input terminal group i corresponds to a first stage matrix switch $1_i$ which has the same number i same as the group i.

The output terminals $E_1$ to $E_N$ are divided into N/n groups each having n output terminals $E_{ni-(n-1)}$ to $E_{ni}$ (i=1 to N). Each output terminal group i corresponds to a third stage matrix switch $3_i$ which has the same number i same as the group i.

The first stage comprises N/n matrix switches $1_1$ to $1_{N/n}$. Each matrix switch $1_i$ (i=1 to N/n) has n input lines $G_1$ to $G_n$ respectively connected to the input terminals $T_{ni-(n-1)}$ to $T_{ni}$ and $2n-1$ output lines $A_1$ to $A_{(2n-1)}$. An input line $G_j$ (j is an arbitrary number) and an output line $A_k$ (k is an arbitrary number) are internally, freely connected in each matrix switch $1_i$.

The second stage comprises $(2n-1)$ matrix switches $2_1$ to $2_{(2n-1)}$. Each matrix switch $2_i$ ($i=1$ to $2n-1$) has $N/n$ input lines $B_1$ to $B_{N/n}$ and $(N/n)+1$ output lines $C_1$ to $C_{(N/n)+1}$. An input line $B_j$ and an output line $C_k$ are internally, freely connected in each matrix switch $2_i$. The output lines $A_1$ to $A_{(2n-1)}$ of the matrix switch $1_i$ ($i=1$ to $N/n$) are connected to the matrix switches $2_1$ to $2_{(2n-1)}$ in one-to-one correspondence, and the input lines $B_1$ to $B_{N/n}$ of the matrix switch $2_j$ ($j=1$ to $2n-1$) are connected to the matrix switches $1_1$ to $1_{N/n}$ in one-to-one correspondence between the first and second stages.

The third stage comprises $(N/n)+1$ matrix switches $3_1$ to $3_{(N/n)+1}$. Each matrix switch $3_i$ ($i=1$ to $(N/n)+1$ has $(2n-1)$ input lines $D_1$ to $D_{(2n-1)}$ and n output lines $F_1$ to $F_n$. An input line $D_j$ and an output line $F_k$ are internally, freely connected in each matrix switch $3_i$. The second and third stages are connected to each other such that the output lines $C_1$ to $C_{(N/n)+1}$ of the matrix switch $2_i$ ($i=1$ to $2n-1$) correspond to the matrix switches $3_1$ to $3_{(N/n)+1}$ in one-to-one correspondence and that the input lines $D_1$ to $D_{(2n-1)}$ of the matrix switch $3_j$ ($j=1$ to $(N/n)+1$) correspond to the matrix switches $2_1$ to $2_{(2n-1)}$ in one-to-one correspondence.

$N/n$ switching circuits $4_1$ to $4_{N/n}$ are provided between the third stage and the output terminals $E_1$ to $E_N$. The switching circuits $4_1$ to $4_{N/n}$ correspond to the matrix switches $3_1$ to $3_{N/n}$ in one-to-one correspondence, and each switching circuit $4_i$ is connected to the matrix switches $3_{(N/n)+1}$.

Each of the switching circuits $4_1$ to $4_{N/n}$ has n switches $SW_1$ to $SW_n$. The center taps of the switches $SW_1$ to $SW_n$, respectively, of the switching circuit $4_i$ ($i=1$ to $N/n$) are connected to the output terminals $E_{ni-(n-1)}$ to $E_{ni}$, respectively, and respective contacts a thereof are connected to the output lines $F_1$ to $F_n$, respectively, of the matrix switch $3_i$. Respective contacts b of the switches $SW_1$ to $SW_n$ of each of the switching circuits $4_1$ to $4_{N/n}$ are connected to the output lines $F_j$ ($j=1$ to n) of the matrix switch $3_{(N/n)+1}$. Each of the switches $SW_1$ to $SW_n$ is switched from the contact a to the contact b or vice versa so that the n output terminals $E_{ni-(n-1)}$ to $E_{ni}$ ($i=1$ to $N/n$) thereof are connected to the output lines $F_1$ to $F_i$ of the matrix switch $3_i$ or the output lines $F_1$ to $F_n$ of the matrix switch $3_{(N/n)+1}$.

The operation of the three stage switching network shown in FIG. 1 will be described. Assuming that the first stage matrix switch $1_1$ connects its input and output lines $G_1$ and $A_1$, that the second stage matrix switch $2_1$ connects its input and output lines $A_1$ and $C_1$, that the third stage matrix switch $3_1$ connects its input and output lines $D_1$ and $F_1$, and that the switch $SW_1$ of the switching circuit $4_1$ is switched to the contact a, the input and output terminals $T_1$ and $E_1$ are connected. In this state, when the third stage matrix switch $3_1$ fails, the input and output terminals $T_1$ and $E_1$ are disconnected. In this case, when the switch $SW_1$ of the switching circuit $4_1$ is switched to the contact b. At the same time, for example, the matrix switch $3_{(N/n)+1}$ connects its input and output lines $D_1$ and $F_1$. When the second stage matrix switch $2_1$ connects its input and output lines $B_1$ and $C_{(N/n)+1}$, the input and output terminals $T_1$ and $E_1$ are connected to each other again.

FIG. 2 shows another embodiment of the present invention. The same reference numerals in FIG. 2 denote the same part as in FIG. 1 and a detailed description thereof is omitted.

The embodiment of FIG. 2 is different from that of FIG. 1 in the following respects. The number of first stage matrix switches is $(N/n)+1$ which is increased by one. The number of third stage matrix switches is $N/n$ which is decreased by one. Each of $2n-1$ second stage matrix switches $5_1$ to $5_{(2n-1)}$ has input lines $B_1$ to $B_{(N/n)+1}$ corresponding to the matrix switches $1_1$ to $1_{(N/n)+1}$ in one-to-one correspondence and output lines $C_1$ to $C_{N/n}$ corresponding to the matrix switches $3_1$ to $3_{N/n}$ in one-to-one correspondence. The switching circuits $4_1$ to $4_{N/n}$ are provided between the input terminals $T_1$ to $T_N$ and the first stage.

The operation of the three stage switching network shown in FIG. 2 will be described.

Assume that the input and output terminals $T_1$ and $E_1$ are connected to each other in the same manner as in FIG. 1. In this state, if the first stage matrix switch $1_1$ fails and the input and output terminals $T_1$ and $E_1$ are disconnected, the switch $SW_1$ of the switching circuit $4_1$ is switched from contact a to contact b. The matrix switch $1_{(N/n)+1}$ connects its input and output lines $G_1$ and $A_1$, and the matrix switch $5_1$ connects its input and output lines $B_{(N/n)+1}$ and $C_1$. As a result, the input and output lines $T_1$ and $E_1$ are connected to each other again.

Figure 3:
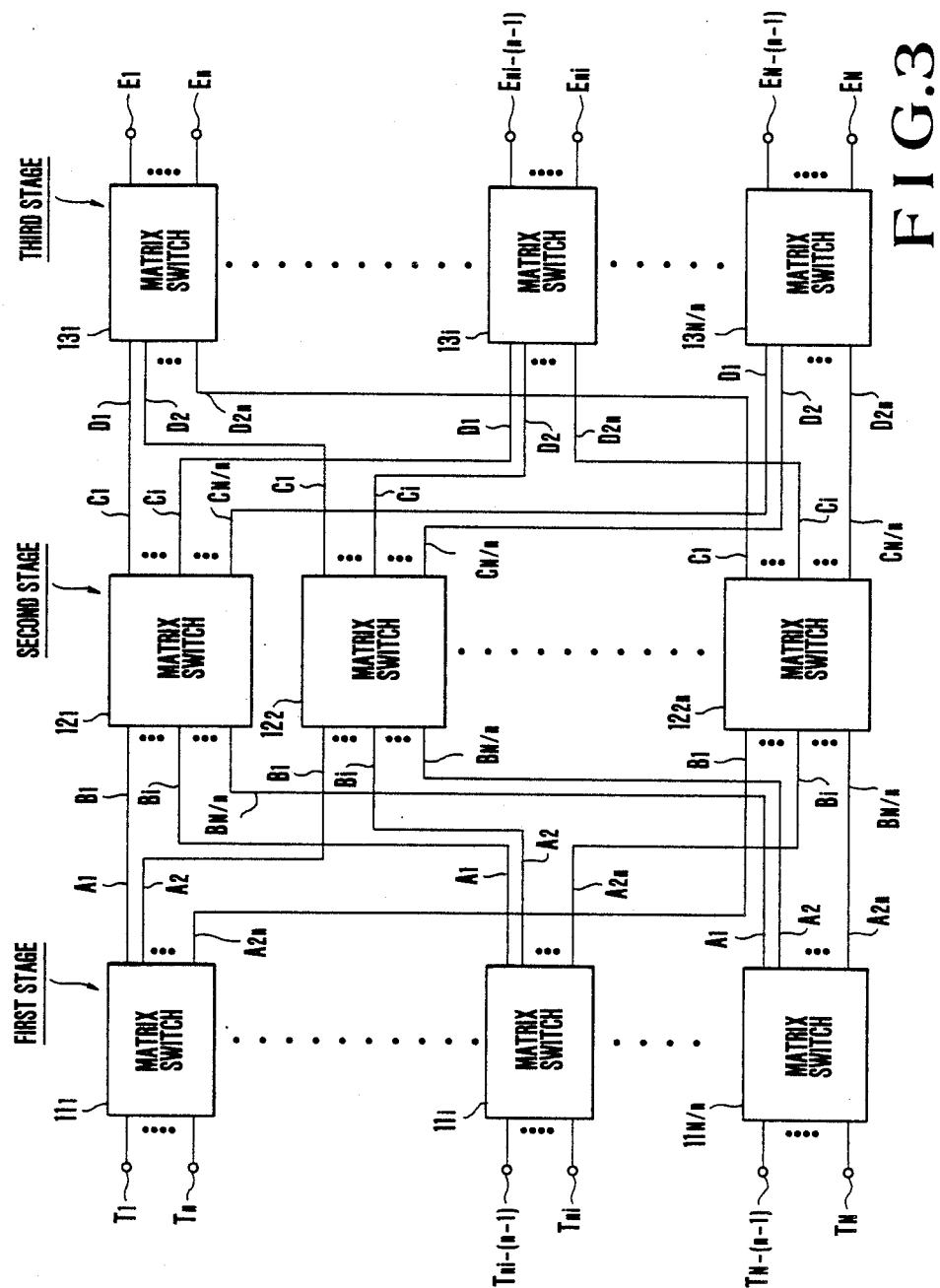
FIG. 3 is a block diagram of a circuit arrangement according to still another embodiment of the present invention.

FIG. 3 is a block diagram of a three stage switching network according to still another embodiment of the present invention. The same reference numerals as in FIG. 1 or 2 denote the same parts in FIG. 3 and a detailed description thereof will be omitted.

Referring to FIG. 3, $N/n$ matrix switches $11_1$ to $11_{N/n}$ constitute a first stage. Each of the matrix switches $11_1$ to $11_{N/n}$ has n input lines and $2n$ output lines $A_1$ to $A_{2n}$. The input and output lines of each matrix switch can be internally, freely connected to each other.

$2n$ matrix switches $12_1$ to $12_{2n}$ constitute a second stage. Each of the matrix switches $12_1$ to $12_{2n}$ has $N/n$ input lines $B_1$ to $B_{N/n}$ and $N/n$ output lines $C_1$ to $C_{N/n}$. The input and output lines of each matrix switch can be internally, freely connected to each other.

$N/n$ matrix switches $13_1$ to $13_{N/n}$ constitute a third stage. Each of the matrix switches $13_1$ to $13_{N/n}$ has $2n$ input lines $D_1$ to $D_{2n}$ and n output lines. The input and output liens of each matrix switch can be internally, freely connected to each other.

Connections between the first and second stages and that between the second and third stages are performed in the same manner as described with reference to FIGS. 1 and 2.

In the network shown in FIG. 3, paths of $2n$ combinations are available for connecting arbitrary one of the input terminals $T_1$ to $T_N$ and arbitrary one of the output terminals $E_1$ to $E_N$, while the number of path combinations necessary for connecting arbitrary input and output terminals is $2n-1$ as follows:

(1) When an arbitrary input terminal of the first stage matrix switch is connected, the number of path combinations used by the remaining $n-1$ input terminals is $n-1$.

(2) When an arbitrary output terminal of the third stage matrix switch is connected, the number of path combinations used by the remaining $n-1$ output terminals is $n-1$.

(3) The number of path combinations for connecting arbitrary input and output terminals is 1.

Therefore, paths of at least $(n-1)+(n-1)+1=2n-1$ combinations are necessary.

In other words, the three stage switching network shown in FIG. 3 has one end-to-end spare path.

In the three embodiments described above, the number of path combinations for connecting one of the input terminals $T_1$ to $T_N$ and one of the output terminals $E_1$ to $E_N$ is 2n. Either network has one spare path and has thus redundancy. In the conventional three stage switching system, the number of output lines of each first stage matrix switch, the number of the second stage matrix switches, and the number of input lines of each third stage matrix switch are $2n-1$ each. Therefore, even when one matrix switch of any stage fails, the function of connecting arbitrary input and output terminals is lost. In contrast to this, the three stage switching system of the circuit arrangement of the present invention has a spare path, as described above. Therefore, even when one matrix switch fails, the function of connecting arbitrary input and output terminals is not lost.

Figure 4:
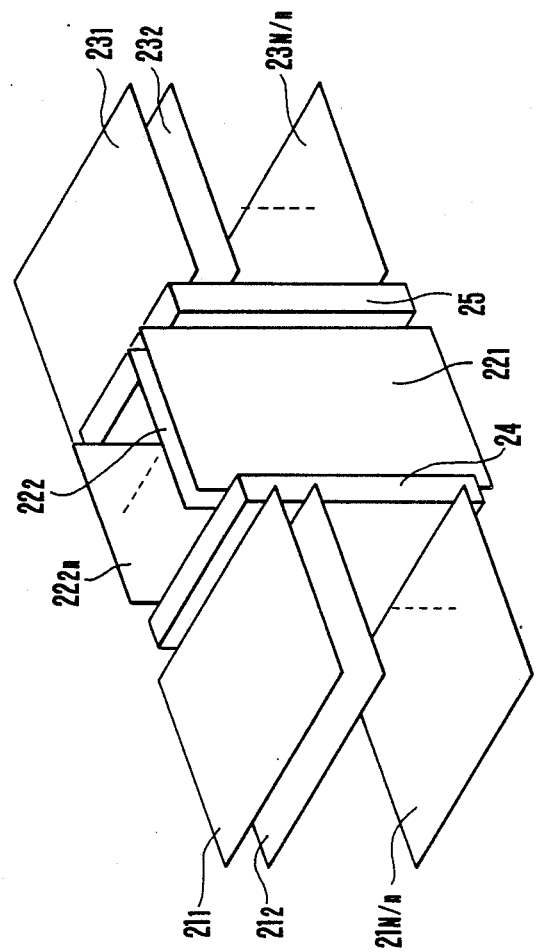
FIG. 4 is a perspective view schematically showing the structure of the apparatus of the present invention.

FIG. 4 is a perspective view schematically showing a structure of the three stage switching apparatus according to an embodiment of the present invention.

Referring to FIG. 4, printed circuit boards $21_1$ to $21_{N/n}$ respectively have the first stage matrix switches $11_1$ to $11_{N/n}$ shown in FIG. 3 and are parallel to each other. One end of each printed circuit board on the output lines $A_1$ to $A_{2n}$ side is fixed to a connector 24 and the other end thereof on the input line side is open.

Printed circuit boards $22_1$ to $22_{2n}$ respectively have the second stage matrix switches $12_1$ to $12_{2n}$ shown in FIG. 3, are parallel to each other, and are perpendicular to the printed circuit boards $21_1$ to $21_{N/n}$. One end of each printed circuit board on the input lines $B_1$ to $B_{N/n}$ side is fixed to the connector 24 and the other end thereof on the output lines $C_1$ to $C_{N/n}$ side is fixed to a connector 25.

Printed circuits boards $23_1$ to $23_{N/n}$ respectively have the third stage matrix switches $13_1$ to $13_{N/n}$, are parallel to each other, and are perpendicular to the printed circuit boards $22_1$ to $22_{2n}$. One end of each printed circuit board on the input lines $D_1$ to $D_{2n}$ side is fixed to the connector 25 and the other end thereof is open.

The output lines $A_1$ to $A_{2n}$ of the first stage are connected to the input lines $B_1$ to $B_{N/n}$ of the second stage through the connector 24, and the output lines $C_1$ to $C_{N/n}$ of the second stage are connected to the input lines $D_1$ to $D_{2n}$ of the third stage through the connector 25.

In the conventional three stage switching system, since the printed circuit boards are electrically connected to each other using a back wired board, the number of signal lines that can be packaged on the back wired board is limited, and the wiring on the back wired board is complex, resulting in poor electrical characteristics.

In contrast to this, according to the present invention, since the second stage printed circuit boards are three-dimensionally arranged to be perpendicular to the first and third stage printed circuit boards, the connecting points of the respective printed circuit boards are close to each other, and connection of the respective printed circuit boards can be performed easy, resulting in improved electric characteristics.

What is claimed is:

1. A three stage switching apparatus having N input terminals and N output terminals comprising:

N/n first matrix switches constituting a first stage, wherein N, n and N/n are integers, each of said first matrix switches having n input lines connected to said N input terminals in one-to-one correspondence and 2n output lines, said input and output lines of each of said first matrix switches being internally, freely connected to each other;

2n second matrix switches constituting a second stage, each of said second matrix switches having N/n input lines connected to said first matrix switches in one-to-one correspondence and N/n output lines, said input and output terminals of each of said second matrix switches being internally, freely connected to each other; and N/n third matrix switches constituting a third stage, each of said third matrix switches having 2n input lines connected to said second matrix switches in one-to-one correspondence and n output lines connected to said output terminals in one-to-one correspondence, said input and output lines of each of said third matrix switches being internally, freely connected to each other.

2. A three stage switching apparatus having N input terminals and N output terminals and freely connecting said input and output terminals to each other comprising:

N/n first matrix switches constituting a first stage, wherein N, and N/n are integers, each of said first matrix switches having n input lines connected to said N input terminals in one-to-one correspondence and $2n-1$ output lines, said input and output lines of each of said first matrix switches being internally, freely connected to each other;

$2n-1$ second matrix switches constituting a second stage, each of said second matrix switches having N/n input lines connected to said first matrix switches in one-to-one correspondence and $(N/n)+1$ output lines, said input and output terminals of each of said second matrix switches capable of being internally, freely connected to each other;

$(N/n)+1$ third matrix switches constituting a third stage, each of said third matrix switches having a $2n-1$ input lines connected to said second matrix switches in one-to-one correspondence and n output lines, said input and output lines of each of said third matrix switches being internally, freely connected to each other; and switching means connected between said third stage and said N output terminals such that a single third matrix switch serves as a spare matrix switch of remaining N/n third matrix switches.

3. An apparatus according to claim 2, wherein said switching means has N two-contact switches having center taps connected to said output terminals in one-to-one correspondence, one contact of each of said switches is connected to one of said output lines of each of said N/n third matrix switches in one-to-one correspondence, and the other contact thereof is connected to corresponding one of said output lines of said single third matrix switches.

4. A three stage switching apparatus having N input terminals and N output terminals and freely connecting said input and output terminals to each other comprising:

$(N/n)+1$ first matrix switches constituting a first stage, wherein N,n and N/n are integers, each of said first matrix switches having n input lines connected to said N input terminals in one-to-one correspondence and $2n-1$ output lines, said input and output lines of each of said first matrix switches being internally, freely connected to each other;

$2n-1$ second matrix switches constituting a second stage, each of said second matrix switches having $(N/n)+1$ input lines connected to said first matrix switches in one-to-one correspondence and $N/n$ output lines, said input and output terminals of each of said second matrix switches being internally, freely connected to each other;

$N/n$ third matrix switches constituting a third stage, each of said third matrix switches having $2n-1$ input lines connected to said second matrix switches in one-to-one correspondence and $n$ output lines, said input and output lines of each of said third matrix switches being internally, freely connected to each other; and switching means connected between said first stage and said N input terminals such that a single first matrix switch serves as a spare matrix switch of remaining $N/n$ third matrix switches.

5. An apparatus according to claim 4, wherein said switching means has N two-contact switches having center taps connected to said input terminals in one-to-one correspondence, one contact of each of said switches is connected to one of said input lines of each of said $N/n$ first matrix switches in one-to-one correspondence, and the other contact thereof is connected to corresponding one of said input lines of said single first matrix switches.

* * * * *